(12) United States Patent
Sarkar et al.

(10) Patent No.: US 10,108,510 B2
(45) Date of Patent: *Oct. 23, 2018

(54) CONTINUOUSLY AVAILABLE PROGRAM REPLICAS

(75) Inventors: Prasenjit Sarkar, San Jose, CA (US); Dinesh Kumar Subhraveti, Milpitas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/461,688

(22) Filed: May 1, 2012

(65) Prior Publication Data

US 2012/0221516 A1   Aug. 30, 2012

Related U.S. Application Data

(63) Continuation of application No. 12/033,834, filed on Feb. 19, 2008, now Pat. No. 8,229,886.

(51) Int. Cl.
*G06F 17/30* (2006.01)
*G06F 11/20* (2006.01)
*G06F 11/14* (2006.01)

(52) U.S. Cl.
CPC ...... *G06F 11/2097* (2013.01); *G06F 11/2038* (2013.01); *G06F 11/1482* (2013.01); *G06F 11/1484* (2013.01); *G06F 11/2048* (2013.01); *G06F 11/2071* (2013.01)

(58) Field of Classification Search
CPC ......... G06F 17/30156; G06F 17/30575; G06F 17/30; G06F 17/30289; G06F 17/30076; G06F 17/30091; G06F 17/30194; G06F 17/30212; G06F 17/30292; G06F 17/30312; G06F 17/30578; G06F 17/30581; G06F 17/305; G06F 17/30286; G06F 17/30067; G06F 17/30008; G06F 11/2097; G06F 11/2038; G06F 11/1484; G06F 11/1482; G06F 11/2071; G06F 11/2048;

(Continued)

(56) References Cited

U.S. PATENT DOCUMENTS

| 5,787,247 | A | | 7/1998 | Norin et al. | |
|---|---|---|---|---|---|
| 6,151,643 | A | * | 11/2000 | Cheng et al. | 710/36 |
| 6,161,196 | A | * | 12/2000 | Tsai | 714/10 |

(Continued)

OTHER PUBLICATIONS

Non-Final Office Action Summary from U.S. Appl. No. 12/033,834 dated Oct. 27, 2010.

(Continued)

*Primary Examiner* — Scott A. Waldron
*Assistant Examiner* — Andalib F Lodhi
(74) *Attorney, Agent, or Firm* — Zilka-Kotab, P.C.

(57) ABSTRACT

A method for replicating a program and data storage according to one embodiment comprises sending program replication data from a first program to a second program, the second program having an application program that is a replica of an application program of the first program; sending data storage requests from the first program to a first storage system; and replicating data stored in the first storage system in a second storage system. Additional methods, systems, and computer program products are disclosed.

25 Claims, 6 Drawing Sheets

(58) Field of Classification Search
CPC ......... G06F 17/30073; G06F 17/30179; G06F 17/30309; G06F 17/30377
USPC ....... 707/610, 615, 626, 636, 655, 659, 660, 707/679, 640
See application file for complete search history.

(56) References Cited

U.S. PATENT DOCUMENTS

| | | | | |
|---|---|---|---|---|
| 6,694,447 | B1* | 2/2004 | Leach et al. ................... | 714/6.3 |
| 7,051,053 | B2* | 5/2006 | Sinha .................. | G06F 11/1451 |
| 7,124,320 | B1* | 10/2006 | Wipfel ................. | G06F 11/203 |
| | | | | 714/13 |
| 7,210,011 | B2 | 4/2007 | Furuumi et al. | |
| 7,434,094 | B2 | 10/2008 | Fujita et al. | |
| 7,617,262 | B2* | 11/2009 | Prahlad et al. | |
| 7,769,722 | B1* | 8/2010 | Bergant et al. ............... | 707/681 |
| 7,827,136 | B1* | 11/2010 | Wang et al. .................. | 707/610 |
| 7,870,095 | B2* | 1/2011 | McBride et al. ............. | 707/615 |
| 7,958,497 | B1* | 6/2011 | Lindo ................. | G06F 11/3632 |
| | | | | 714/799 |
| 7,962,709 | B2* | 6/2011 | Agrawal ....................... | 711/162 |
| 8,019,732 | B2* | 9/2011 | Paterson-Jones et al. .... | 707/674 |
| 8,229,886 | B2 | 7/2012 | Sarkar et al. | |
| 2003/0028868 | A1* | 2/2003 | Kumakura .................... | 717/175 |
| 2003/0078946 | A1* | 4/2003 | Costello et al. .............. | 707/201 |
| 2003/0078947 | A1* | 4/2003 | Garg ........................ | H04L 29/06 |
| 2004/0153609 | A1* | 8/2004 | Melamed et al. ............ | 711/141 |
| 2004/0260736 | A1* | 12/2004 | Kern et al. .................... | 707/204 |
| 2005/0071372 | A1* | 3/2005 | Bartfai et al. ............. | 707/104.1 |
| 2005/0268057 | A1* | 12/2005 | Satoyama et al. ............ | 711/162 |
| 2006/0112154 | A1 | 5/2006 | Douceur et al. | |
| 2006/0179082 | A1* | 8/2006 | Boyd et al. ................... | 707/203 |
| 2006/0253672 | A1* | 11/2006 | Nonaka et al. ............... | 711/162 |
| 2006/0256431 | A1 | 11/2006 | Yamato et al. | |
| 2006/0265431 | A1 | 11/2006 | Yamato et al. | |
| 2007/0101001 | A1* | 5/2007 | Cromer ................. | G06F 9/4856 |
| | | | | 709/226 |
| 2007/0130432 | A1* | 6/2007 | Aigo ............................ | 711/162 |
| 2007/0185852 | A1* | 8/2007 | Erofeev ............................ | 707/4 |
| 2007/0234296 | A1 | 10/2007 | Zorn et al. | |
| 2008/0104345 | A1 | 5/2008 | Maruyama et al. | |
| 2008/0172573 | A1* | 7/2008 | Jansson ............... | G06F 11/2035 |
| | | | | 714/15 |
| 2009/0210455 | A1 | 8/2009 | Sarkar et al. | |

OTHER PUBLICATIONS

Non-Final Office Action Summary from U.S. Appl. No. 12/033,834 dated Apr. 26, 2011.
Final Office Action Summary from U.S. Appl. No. 12/033,834 dated Nov. 21, 2011.
Notice of Allowance and Fee(s) Due from U.S. Appl. No. 12/033,834 dated Mar. 15, 2012.
Sarkar et al., U.S. Appl. No. 12/033,834, filed Feb. 19, 2008.

* cited by examiner

CONTINUOUSLY AVAILABLE PROGRAM REPLICAS

RELATED APPLICATIONS

This application is a continuation of U.S. patent application Ser. No. 12/033,834 filed Feb. 19, 2008, which is herein incorporated by reference.

BACKGROUND

The present invention relates to program and data storage systems, and more particularly, this invention relates to program and storage replication.

Service downtime is one of the major reasons for revenue loss in modern enterprises. To date, however, proposed solutions have failed to provide an accurate replication system that takes into account both program state and data storage state.

BRIEF SUMMARY

A method for replicating a program and data storage according to one embodiment comprises sending program replication data from a first program to a second program, the second program having an application program that is a replica of an application program of the first program; sending data storage requests from the first program to a first storage system; and replicating data stored in the first storage system in a second storage system.

A computer program product for replicating a program and data storage according to one embodiment comprises a computer readable storage medium having computer readable program code embodied therewith, the computer readable program code including computer readable program code configured to send program replication data from a first program to a second program, the second program having an application program that is a replica of an application program of the first program; computer readable program code configured to send data storage requests from the first program to a first storage system; computer readable program code configured to send data storage replication data from the first program to the second program, the second program sending data storage requests to a second storage system based on the data storage replication data for replicating data stored in the first storage system in the second storage system, wherein the program replication data enables mirroring of processor and memory state associated with the first program, wherein the program replication data further enables mirroring of any data read by the first program, computer readable program code configured to send outputs of the first program to a user or application; and computer readable program code configured to enable user or application interaction with the second program as if it were the first program when the first program fails, wherein outputs of the second program are sent to the user or program.

A system having replicated programs and data storage comprises a first device running a first program; a second device running a second program, the first device sending program replication data to the second device, the second program having an application program that is a replica of an application program of the first program; a first storage system receiving data storage requests from the first device; and a second storage system, data stored in the first storage system being replicated in the second storage system.

A system having replicated programs and data storage according to one embodiment comprises a device running a first program and a second program, the device sending program replication data to the second program, the second program having an application program that is a replica of an application program of the first program; a first storage system receiving data storage requests from the first device; and a second storage system, data stored in the first storage system being replicated in the second storage system.

A computer program product according to one embodiment comprises a computer useable medium having a computer readable program, wherein the computer readable program when executed on a computer causes the computer to: send program replication data from a first program to a second program, the second program having an application program that is a replica of an application program of the first program; send data storage requests from the first program to a first storage system; and replicate data stored in the first storage system in a second storage system.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

In one general embodiment, a method for replicating a program and data storage comprises sending program replication data from a first program to a second program, the second program having an application program that is a replica of an application program of the first program; sending data storage requests from the first program to a first storage system; and replicating data stored in the first storage system in a second storage system.

In another general embodiment, a method for replicating a program and data storage comprises sending prograth replication data from a first program to a second program, the second program having an application program that is a replica of an application program of the first program; sending data storage requests from the first program to a first storage system; and sending data storage replication data from the first program to the second program, the second program sending data storage requests to a second storage system based on the data storage replication data for replicating data stored in the first storage system in the second storage system. The program replication data enables mirroring of processor and memory state associated with the first program, wherein the program replication data further enables mirroring of any data read by the first program. Outputs of the first program are sent to a user or application. If the first program fails, user or application interaction with the second program is enabled as if it were the first program, outputs of the second program being sent to the user or program.

In another general embodiment, a system having replicated programs and data storage comprises a first device running a first program; a second device running a second program, the first device sending program replication data to the second device, the second program having an application program that is a replica of an application program of the first program; a first storage system receiving data storage requests from the first device; and a second storage system, data stored in the first storage system being replicated in the second storage system.

In another general embodiment, a system having replicated programs and data storage comprises a first device running a first program; a second device running a second program, the first device sending program replication data to the second device, the second program having an application program that is a replica of an application program of the first program such that the second program is in a same state as the first program; a first storage system receiving data storage requests from the first device; and a second storage system receiving data storage requests from the second device. The first device sends data storage replication data from the first program to the second device, the second device sending data storage requests to a second storage system based on the data storage replication data for replicating data stored in the first storage system in the second storage system. Outputs of the first program are sent to a user or application, and further comprising, if the first program fails, enabling user or application interaction with the second program as if it were the first program, outputs of the second program being sent to the user or program.

Computer program products may implement or enable any of the foregoing embodiments.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without any combination of the other features described.

As alluded to above, various embodiments may include redundant software and/or hardware. One approach to providing software redundancy is to mirror the state of a running first program to one or a set of replicas (or clones) such that, in case of a failure, one of the replicas assumes the place of the previously running application instance, i.e., the first program. This provides the paradigm of continuously available replica programs, where a replica can take over the functionality of the failed primary or first program without any downtime. Program replication also avoids the expensive time and process burden of starting a new instance on the same or a different machine.

Program replicas or identically behaving copies of a program are useful to organizations in many respects. Illustrative benefits include (i) high availability: if one program dies, the replica can be used for continuous processing without any downtime; (ii) migration: making a replica of a program may allow an application to be migrated from one machine to another machine; (iii) maintenance: a replica may be recycled and resynchronized to eliminate most resource leaks.

Although the basic idea of replication is simple, efficiently replicating real applications was previously difficult in practice. Toward this end, particularly preferred embodiments meet two important goals. First, the solution supports replication of the entire state of the application. For instance, one approach replicates the memory state as well as the states associated with network and storage resources. Second, the program application need not be modified by recompiling it with custom libraries, as this is often unacceptable due to the complexity of the process and a possibly large installed base of closed-source legacy applications.

While it is possible to provide program and storage replication independently of each other (e.g., the latter via storage system replication or LVM mirroring) so that each can survive a disaster, the fail-over process may not result in a consistent state because the state of cached data in the operating system buffers of the replicas may not be identical in such an approach.

As will be described in more detail below, the continuously available program replicas in some embodiments are immune to site failures where the main program and its underlying storage both encounter failure. Accordingly, in preferred approaches, the program and storage replication are coordinated so that program replicas are able to survive a simultaneous disaster, e.g., any combination of program, storage and link failure.

In one illustrative approach, a preferred embodiment coordinates program and storage replication such that an application program's replicas are able to survive site failures and continue execution without any disruption. In this approach, program replication provides mirroring of CPU and memory state as well as data read from storage or networks, while storage replication takes care of data written to a data storage system. This composite approach integrates both forms of replication to account for data consistency, which is particularly useful in enterprise-class solutions for continuous program availability across site failures.

The following description will set forth some illustrative embodiments for coordinated replication. Note that this is done by way of example only, and various features can be added, removed, or replaced in permutations of each of the various embodiments. In the following paragraphs, various architectures are described in detail. First, illustrative methodology for replicating program and data storage is set forth. Next, there is described an illustrative program replication mechanism that uses software level replication to synchronize the state of the program replicas. Next, illustrative embodiments that integrate storage and program replication are described.

Program Replication

Methods of program replication, including generation and transmission of replication data, may take any of many forms. In some approaches, custom code may be developed to transmit any data needed to effect replication. In other approaches, known methods of replicating programs can be used.

In one approach, the replication data includes user or application inputs to the first program. The second program then operates on the inputs as the first program operates on the inputs, and so will have the same state.

In a particularly preferred approach, the program replication technique uses Record and Replay (RR). In principle, this technique can be built on top of any program replication system that provides similar capabilities. RR is designed to support the recording and subsequent replay of the execution of unmodified (or modified) applications running on single- or multi-processor systems and/or across remote systems. Multiple instances of an application are simultaneously executed in separate virtualized environments called containers, which facilitate state replication between the application instances by resolving resource conflicts and providing a uniform view of underlying operating system resources across all replicas. Accordingly, the "programs" referred to herein may refer to the application program being replicated. Further, the "programs" referred to herein may also collectively refer to the application program being replicated and any software enabling the replication. Yet further, the "programs" referred to herein may refer to the software enabling the replication.

The virtualization layer that creates the container abstraction actively monitors the primary instance of the application by trapping several system calls, and synchronizes its state with that of the clones by transferring the necessary information to enforce identical state among them.

The virtualization layer that creates the container abstraction actively monitors the primary instance of the application by trapping several system calls, and synchronizes its state with that of the clones by transferring the necessary information to enforce identical state among them. In particular, RR addresses the replication of relevant operating system state (such as network state to preserve network connections across failures) and the state that results from nondeterministic interleaved accesses to shared memory in SMP systems. This allows RR to enforce all replicas to traverse identical code paths in the presence of such non-determinism.

Unlike hardware level replication, RR's application level approach excludes the additional state introduced by other lower layers of software and is potentially more efficient. RR logs high-level events related to the program rather than low-level hardware interrupts and operating system related events. This level of event description significantly reduces the amount of information necessary to be logged and propagated in order to keep the primary and the replicas in synchrony.

Furthermore, RR does not require hardware level coupling between the primary and replicas to perform the state replication. This allows the hardware which hosts the RR containers to be heterogeneous with different numbers of CPUs and different amounts of physical memory, the primary and replica could potentially be geographically separated, making RR applicable to disaster recovery scenarios.

Integrated Storage & Program Replication

Presented below are three illustrative mechanisms for integrated storage and program replication that can be used to provide continuous availability and be immune to site failures. Each mechanism is differentiated by the storage replication technique used.

Figure 1:
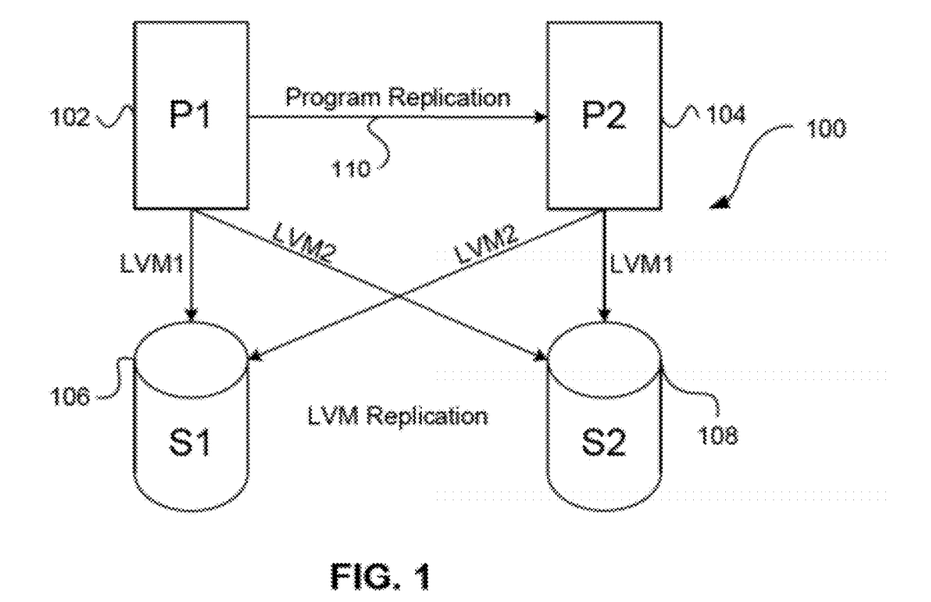
FIG. 1 is a system diagram of a system according to one embodiment.

FIG. 1 illustrates a system 100 according to one embodiment. As shown, the system 100 includes a first program 102 (P1), a second program 104 (P2), a first storage system 106 (S1) and a second storage system 108 (S2).

The first and second programs 102, 104 may be running on the same computer on the same processor; on the same computer on different devices, e.g., on different processors or processor cores of a common processor; on different computing devices located remotely from one another; etc.

Similarly, the first and second storage systems may be present on the same storage device, present on different storage devices, etc. For instance, the storage systems may be present on a single hard disk drive or mother board (e.g., RAM), with data stored in different areas of the disk or memory. In another example, the storage systems may not share components, such as where two disk drives are used.

The first program 102 sends program replication data to the second device 104 such that the second program is a replica of the first program. The first program 102 sends data storage requests to the first storage system 106.

Data stored in the first storage system 106 is replicated in the second storage system 108. Any known mirroring technique can be used for this purpose. One approach uses Logical Volume Manager (LVM) mirroring (replication), where LVM replication keeps the contents of the primary storage system 106 and replica storage in synch.

Assume for the present discussion that the system 100 is based on LVM mirroring. The first program 102 uses LVM mirroring on both storage systems 106, 108 via LVM links. Upon a real or suspected failure of the first program 102, the second program 104 does the same on the second and first storage systems 108, 106.

A program replication channel 110 allows transmission of the program, memory and storage state, allowing the first and second programs to remain synchronized, as well as allows the second program 104 to recover from a simultaneous failure of the first program 102 and the first storage system 106 with the appropriate recovery protocol.

In one approach, since the first program 102 takes care of storage replication, the second program 104 may or may not write data to the second storage system 108 during normal operation of the first program.

Figure 2:
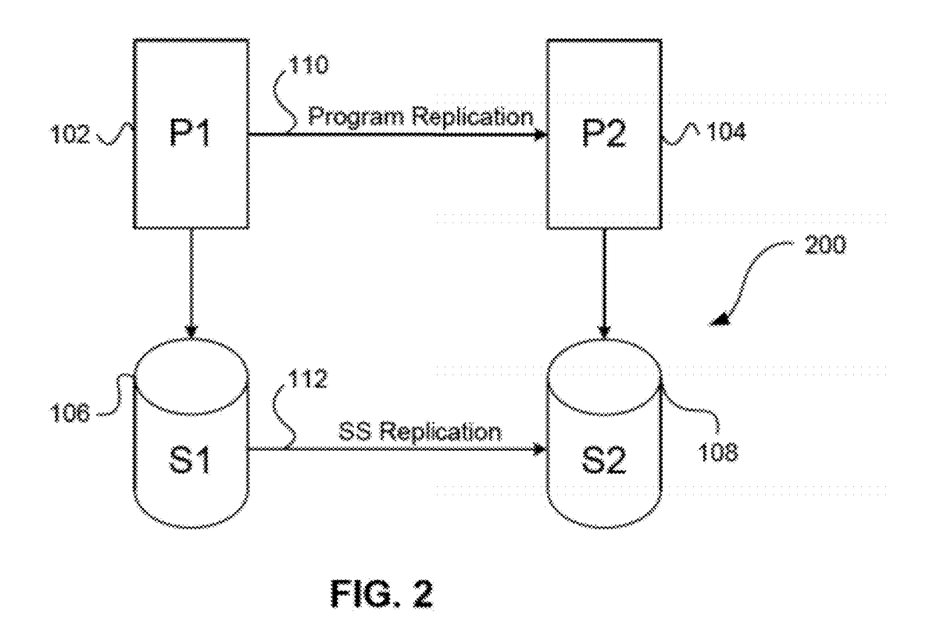
FIG. 2 is a system diagram of a system according to one embodiment.

FIG. 2 illustrates a system 200 according to another embodiment. This system 300 has similar components as the system 100 of FIG. 1, but is based on independent replication by one or both storage systems.

In one embodiment, data storage requests are sent from the first storage system 106 to the second storage system 108, preferably directly to the second storage system via appropriate connections, with or without traversing secondary programs. One approach uses synchronous replication between the first and second (primary and replica) storage systems 106, 108. Such synchronous replication may be at the block level.

In one illustrative approach, the first and second programs 102, 104 access the storage systems 106, 108 respectively and also have a program replication channel 110. The storage systems 106, 108 have an independent storage replication channel 112. This allows the second program 104 to recover from a simultaneous failure of the first program 102 and first storage system 106 with the appropriate recovery protocol. Since storage replication is taken care of via the storage replication channel 112, the second program 104 may or may not write data to the second storage system 108 during normal operation of the first program 102.

Figure 3:
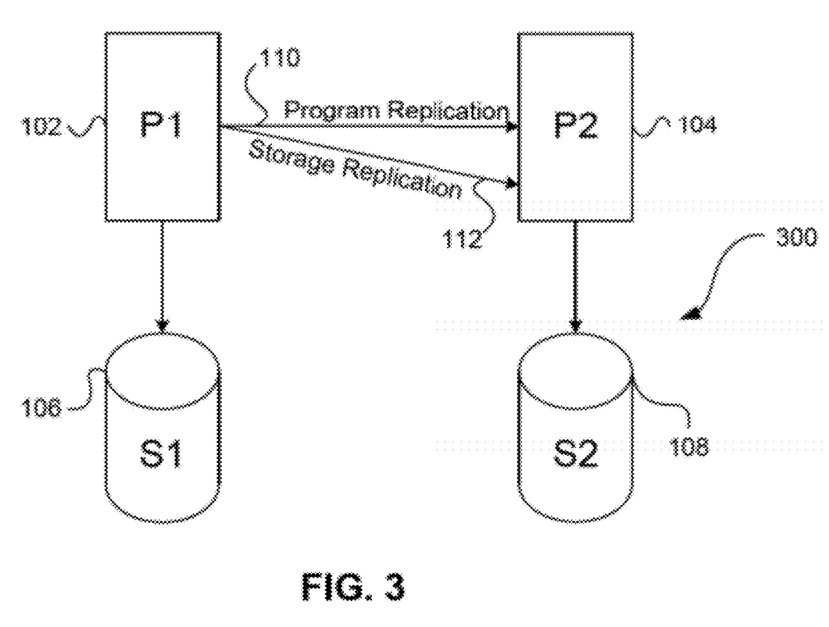
FIG. 3 is a system diagram of a system according to one embodiment.

FIG. 3 illustrates a system 300 according to another embodiment. This system 300 has similar components as the systems 100, 200 of FIGS. 1 and 2, except that the first and second programs 102, 104 are responsible for both program and storage replication. The first and second programs 102, 104 access the first and second storage systems 106, 108 respectively and also have program and storage replication channels 110, 112. In one embodiment, data stored in the first storage system is replicated in the second storage system by sending data storage replication data from the first program 102 to the second program 104, the second program sending data storage requests to the second storage system 108 based on the data storage replication data.

This approach allows the second program 104 to recover from a simultaneous failure of the first program 102 and the first storage system 106 with the appropriate recovery protocol. Since the second program 104 is now involved in storage replication, the second program 104 writes data to the second storage system 108.

The system 300 shown in FIG. 3 is different from the first two in that the first program 102 and its replica (second program) 104 are responsible for storage replication. The program 102 and replica 104 access the respective storage systems independently of each other, and by virtue of having their executions synchronized using program replication techniques, their respective storage remains identical.

This system 300 is particularly reliable for negating site failures when combined with a program replication scheme such as RR, as it supports write synchronization. When the first program 102 performs a write operation, sufficient information may be conveyed to the replica 104 to ensure the replica's execution has the same effect on its combined program and storage state.

The system 300 of FIG. 3 is particularly reliable in that, if the primary site fails, any uncommitted data in the primary site (its cache) will be reflected in the secondary storage. Particularly, this scheme ensures that the same data is in the file system (either cache of disk) of both the primary site and the secondary site and the loss of uncommitted writes in the primary site does not result in loss of data in the secondary site.

General Methodology

Figure 4:
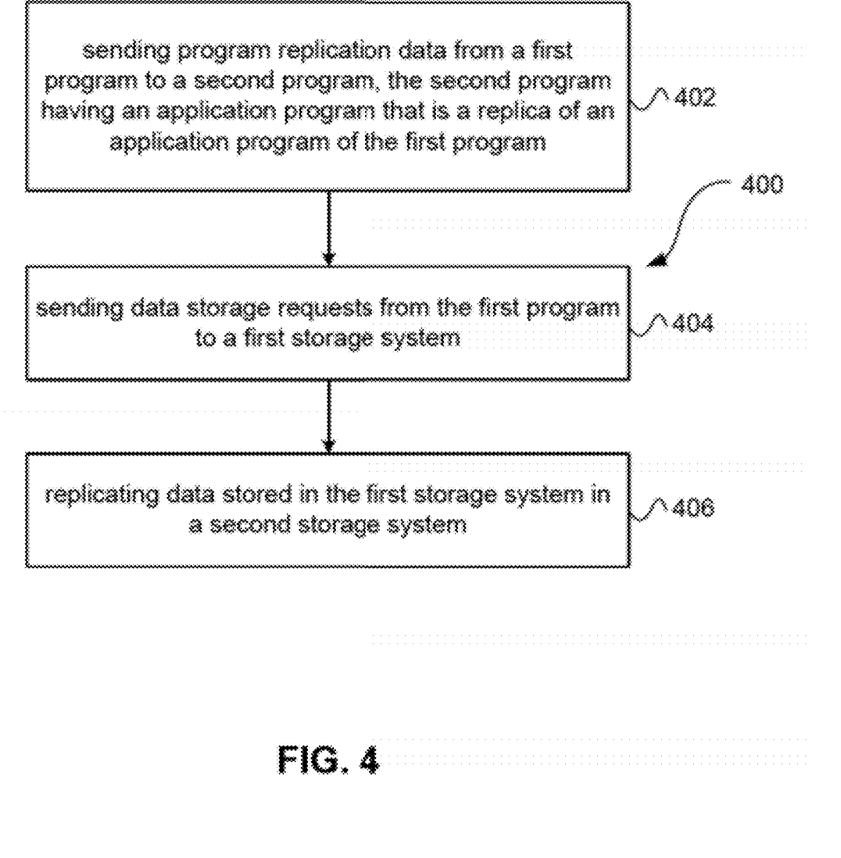
FIG. 4 is a flow diagram of a method for replicating a program and data storage according to a general embodiment.

FIG. 4 illustrates a method 400 for replicating a program and data storage according to a general embodiment. As an option, the present method 400 may be implemented in the context of the functionality and architecture of FIGS. 1-3. However, the method 400 may be carried out in any desired environment. It should be noted that any aforementioned definitions may apply during the present description.

With continued reference to FIG. 4, in operation 402, program replication data is sent from a first program to a second program, the second program operating as a replica of the first program. In operation 404, data storage requests are sent from the first program to a first storage system. Such requests may include read and/or write requests. Data stored in the first storage system is replicated in a second storage system in operation 406.

As alluded to above, some embodiments resolve the issue of write synchronization. When a failure occurs, there may be unsynchronized writes in the system which may cause an unintended divergence between the states of P1 and P2. To resolve the situation, the system may have a mechanism to recover uncommitted writes by the first and second programs, respectively.

Figure 5:
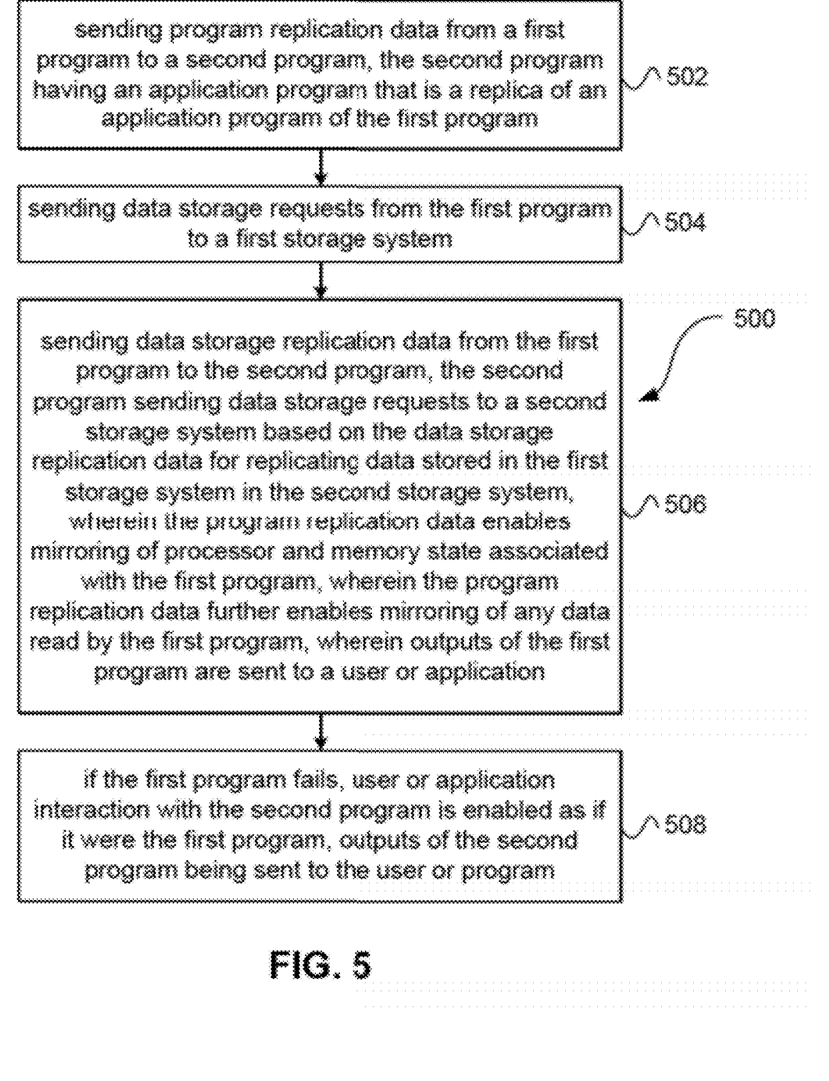
FIG. 5 is a flow diagram of a method for replicating a program and data storage according to an embodiment generally having a system configuration as set forth in FIG. 3.

FIG. 5 illustrates a method 500 for replicating a program and data storage according to an embodiment generally having a system configuration as set forth in FIG. 3. With reference to FIG. 5, in operation 502, program replication data is sent from the first program to the second program, the second program having an application program that is a replica of an application program of the first program. In operation 504, data storage requests are sent from the first program to a first storage system. In operation 506, data storage replication data is sent from the first program to the second program, the second program sending data storage requests to a second storage system based on the data storage replication data for replicating data stored in the first storage system in the second storage system. The program replication data enables mirroring of processor and memory state associated with the first program, where the program replication data further enables mirroring of any data read by the first program. Outputs of the first program are sent to a user or application. Generally, the outputs can be any type of output, such as a visual representation of a document if the underlying application program is a word processing document, a visual representation of a spreadsheet if the underlying application is a spreadsheet application, a rendered image if the underlying application is a graphics program, etc. In operation 508, if the first program fails, user or application interaction with the second program is enabled as if it were the first program, outputs of the second program being sent to the user or program.

Examples of Operation on Failure

While the following exemplary scenarios are described in terms of the system 100 of FIG. 1 using LVM mirroring, it should be understood that the general teachings and procedures are applicable to other embodiments of the present invention, including those of FIGS. 2-5. Further, the following examples are not meant to be interpreted as the only manner of operation on failure.

Failure of the first program: When the first program 102 fails, the second program 104 detects the failure and suspends the program replication link and continues processing with LVM mirroring to both the first storage system 106 and the second storage system 108. On suspension, the second program 104 re-enables write operations. The first storage system 106 and the second storage system 108 are synchronized, so no coordinated storage recovery is needed. At this point the second program 104 will diverge from the failed state of the first program 102. On failback, the first program 102 will resynchronize with the second program 104.

Failure of the first storage system: When the first storage system 106 fails, the first program 102 detects the failure and switches over to the second storage system 108 as the sole storage system. A similar action is performed by the second program 104 either on failure detection or by communication from the first program 102. The second storage system 108 is presumed to have the latest state of the data, so no special action is needed. The second program 104 preferably does not enable write operations. The first storage system 106 and the second storage system 108 are resynchronized when the first storage system 106 fails back.

Failure of program replication link: When the program replication link 110 fails, the first program 102 and the second program 104 interpret this as failures of the second program 104 and the first program 102 respectively. The first program 102 and the second program 104 both suspend program as well as storage replication and diverge in terms of both program and storage state. On suspension, the second program 104 re-enables write operations. Since the first storage system 106 and the second storage system 108 are synchronized, so no coordinated storage recovery is needed. The first program 102, the first storage system 106 and the second program 104, the second storage system 108 resynchronize in a coordinated fashion on failback.

Failure of storage replication link: When the storage replication link 112 fails, the first program 102 and the second program 104 interpret this as failures of the second storage system 108 and the first storage system 106 respectively. The first program 102 and the second program 104 both suspend program as well as storage replication and diverge in terms of both program and storage state. However, the second program 104 tries to recover any unsynchronized writes to the first storage system 106 via the first program 102 assuming the existence of the program replication link. On suspension, the second program 104 re-enables write operations. The first program 102, the first storage system 106 and the second program 104, the second storage system 108 resynchronize in a coordinated fashion on failback.

Link failure: When both the storage and program replication links fail, the first program 102 and the second program 104 interpret this as failures of the second program 104, the second storage system 108 and the first program 102, the first storage system 106 respectively. The first program 102 and the second program 104 both suspend program as well as storage replication and diverge in terms of both program and storage state. Due to the absence of links, all unsynchronized program and storage state is not recovered. On suspension, the second program 104 re-enables write operations. The first program 102, the first storage system 106 and the second program 104, the second storage system 108 resynchronize in a coordinated fashion on failback.

Site failure: When both the first program 102 and the first storage system 106 fail, the second program 104 suspends both program and storage replication and starts to diverge in terms of both program and storage state. Due to the absence of the first program 102 and the first storage system 106, all unsynchronized program and storage state is not recovered. On suspension, the second program 104 re-enables write operations. The first program 102, the first storage system 106 and the second program 104, the second storage system 108 resynchronize in a coordinated fashion on failback.

In various embodiments, during normal operation, outputs of the first program are sent to a user or application (e.g., a third program). In a failure situation where the first program fails (or optionally is deemed to have failed), user or application interaction with the second program may be enabled as if it were the first program. Likewise, outputs of the second program are sent to the user or program.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
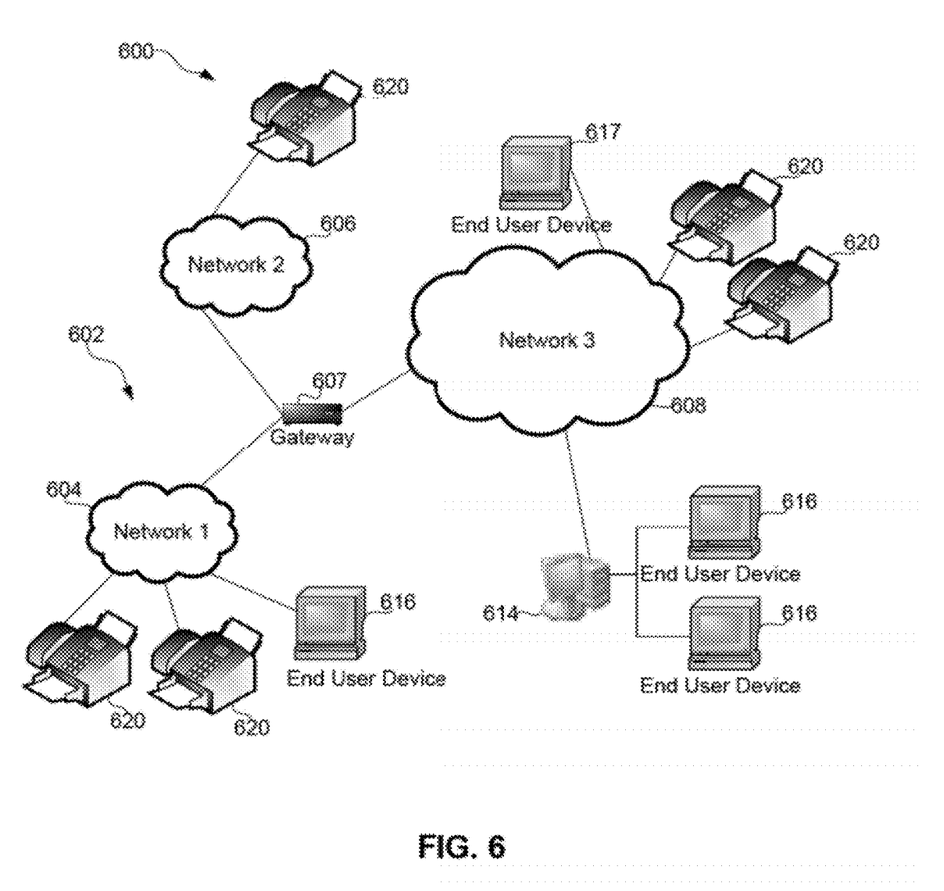
FIG. 6 illustrates a network architecture, in accordance with one embodiment.

FIG. 6 illustrates a network architecture 600, in accordance with one embodiment. As an option, the functionality and architecture of FIGS. 1-5 may be implemented in the context of the network architecture 600. However, the functionality and architecture of FIGS. 1-5 may be carried out in any desired environment. It should be noted that the aforementioned definitions may apply during the present description.

As shown in FIG. 6, a plurality of remote networks 602 are provided including a first remote network 604 and a second remote network 606. A gateway 607 may be coupled between the remote networks 602 and a proximate network 608. In the context of the present network architecture 600, the networks 604, 606 may each take any form including, but not limited to a LAN, a WAN such as the Internet, PSTN, internal telephone network, etc.

In use, the gateway 607 serves as an entrance point from the remote networks 602 to the proximate network 608. As such, the gateway 607 may function as a router, which is capable of directing a given packet of data that arrives at the gateway 607, and a switch, which furnishes the actual path in and out of the gateway 607 for a given packet.

Further included is at least one data server 614 coupled to the proximate network 608, and which is accessible from the remote networks 602 via the gateway 607. It should be noted that the data server(s) 614 may include any type of computing device/groupware. Coupled to each data server 614 is a plurality of user devices 616. Such user devices 616 may include a desktop computer, lap-top computer, hand-held computer, printer or any other type of logic. It should be noted that a user device 617 may also be directly coupled to any of the networks, in one embodiment. A facsimile machine 620 or series of facsimile machines 620 may be coupled to one or more of the networks 604, 606, 608.

It should be noted that databases and/or additional components may be utilized with, or integrated into, any type of network element coupled to the networks 604, 606, 608. In the context of the present description, a network element may refer to any component of a network.

Figure 7:
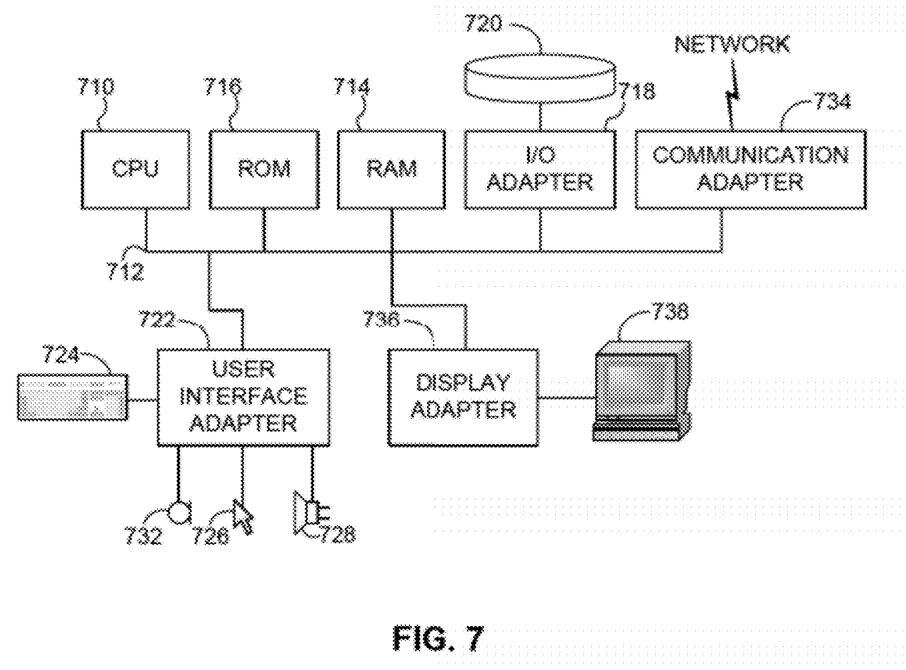
FIG. 7 shows a representative hardware environment that may be associated with the servers and/or clients of FIG. 6, in accordance with one embodiment.

FIG. 7 shows a representative hardware environment associated with a user device 616 of FIG. 6, in accordance with one embodiment. Such FIG. illustrates a typical hardware configuration of a workstation having a central processing unit 710, such as a microprocessor, and a number of other units interconnected via a system bus 712.

The workstation shown in FIG. 7 includes a Random Access Memory (RAM) 714, Read Only Memory (ROM) 716, an I/O adapter 718 for connecting peripheral devices such as disk storage units 720 to the bus 712, a user interface adapter 722 for connecting a keyboard 724, a mouse 726, a speaker 728, a microphone 732, and/or other user interface devices such as a touch screen and a digital camera (not shown) to the bus 712, communication adapter 734 for connecting the workstation to a communication network 735 (e.g., a data processing network) and a display adapter 736 for connecting the bus 712 to a display device 738.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for replicating a program and data storage, the method comprising:
   recording, as program replication data, user input to a first program by monitoring the first program and trapping system calls;
   sending the program replication data from the first program to a second program such that the second program operates on the same user input as the first program, the second program having an application program that is a replica of an application program of the first program, the program replication data causing the second program to mirror a state of the first program for enabling at least one of a user and an application interaction with the second program as if it were the first program when the first program fails;
   sending data storage requests from the first program to a first storage system; and
   replicating data stored in the first storage system in a second storage system.

2. A method as recited in claim 1, wherein the replication data includes inputs to the first program, the second program operating on the inputs as the first program operates on the inputs.

3. A method as recited in claim 1, wherein the program replication data is used to mirror processor and memory state associated with the first program in a system running the second program, wherein the program replication data is also used to mirror any data read by the first program.

4. A method as recited in claim 1, wherein replicating data stored in the first storage system in the second storage system includes sending data storage requests from the first program to the second storage system.

5. A method as recited in claim 4, wherein the second program does not send data storage requests to the second storage system that replicates data stored in the first storage system during normal operation of the first program.

6. A method as recited in claim 4, wherein logical volume management is used to replicate the data stored in the first storage system in the second storage system.

7. A method as recited in claim 1, wherein replicating data stored in the first storage system in the second storage system includes sending data storage requests from the first storage system to the second storage system.

8. A method as recited in claim 7, wherein the second program does not send data storage requests to the second storage system that replicates data stored in the first storage system during normal operation of the first program.

9. A method as recited in claim 7, wherein the data storage requests are sent directly from the first storage system to the second storage system.

10. A method as recited in claim 1, wherein replicating data stored in the first storage system in the second storage system includes sending data storage replication data from the first program to the second program, the second program sending data storage requests to the second storage system based on the data storage replication data.

11. A method as recited in claim 1, wherein outputs of the first program are sent to at least one of the user and the application, and further comprising sending outputs of the second program to at least one of the user and the application.

12. A method as recited in claim 1, wherein, upon detecting failure of the first program, the second program suspends program replication and sends data storage requests to at least one of the first and second storage systems.

13. A method as recited in claim 1, wherein, upon detecting failure of the first storage system, the first program uses the second storage system as the primary storage system, thereby improving efficiency of a first device running the first program by reducing an amount of processing power and run time consumed by the first device in order to maintain operation following the failure of the first storage system.

14. A method as recited in claim 1, wherein a failure to transfer program replication data from the first program to the second program is interpreted by the first program as a failure of the second program and by the second program as a failure of the first program, wherein the program states of the first and second programs then diverge, wherein the first program sends data storage requests to one of the storage systems, wherein the second program sends data storage requests to the other of the storage systems.

15. A method as recited in claim 14, wherein, upon resuming transfer of program replication data from the first program to the second program, the first and second programs synchronize, wherein the first and second storage systems synchronize such that data stored on one of the storage systems during the failure is replicated on the other storage system.

16. A method as recited in claim 1, wherein a failure to replicate data stored in the first storage system in the second storage system is interpreted by the first program as a failure of the second storage system and by the second program as a failure of the first storage system, wherein the program states of the first and second programs then diverge, wherein the first program sends data storage requests to the first storage system and the second program sends data storage requests to the second storage system upon diverging.

17. A computer program product for replicating a program and data storage, the computer program product comprising:
 a non-transitory computer readable storage medium having computer readable program code embodied therewith, the computer readable program code comprising:
  computer readable program code configured to record, as program replication data, user input to a first program by monitoring the first program and trapping system calls;
  computer readable program code configured to send the program replication data from the first program to a second program such that the second program operates on the same user input as the first program, the second program having an application program that is a replica of an application program of the first program;
  computer readable program code configured to send data storage requests from the first program to a first storage system;
  computer readable program code configured to send data storage replication data from the first program to the second program, the second program sending data storage requests to a second storage system based on the data storage replication data for replicating data stored in the first storage system in the second storage system,
  wherein the program replication data enables mirroring of processor and memory state associated with the first program, wherein the program replication data further enables mirroring of any data read by the first program,
  computer readable program code configured to send outputs of the first program to at least one of a user and an application; and
  computer readable program code configured to enable interaction of at least one of the user and the application with the second program as if it were the first program when the first program fails, wherein outputs of the second program are sent to at least one of the user and the application.

18. The computer program product as recited in claim 17, wherein, upon detecting failure of the first program, the second program suspends program replication and sends data storage requests to at least one of the first and second storage systems.

19. The computer program product as recited in claim 17, wherein, upon detecting failure of the first storage system, the first program uses the second storage system as the primary storage system, thereby improving efficiency of a first device running the first program by reducing an amount of processing power and run time consumed by the first device in order to maintain operation following the failure of the first storage system.

20. The computer program product as recited in claim 17, wherein a failure to transfer program replication data from the first program to the second program is interpreted by the first program as a failure of the second program and by the second program as a failure of the first program, wherein program states of the first and second programs then diverge, wherein the first program sends data storage requests to one of the storage systems, wherein the second program sends data storage requests to the other of the storage systems.

21. The computer program product as recited in claim 17, wherein the computer readable program code configured to enable the interaction of at least one of the user and the application with the second program as if it were the first program further comprises computer readable program code configured to direct inputs from the at least one of the user and the application to the second program and send the outputs of the second program to the at least one of the user and the application when the first program has failed.

22. The computer program product as recited in claim 17, wherein a failure to replicate data stored in the first storage system in the second storage system is interpreted by the first program as a failure of the second storage system and by the second program as a failure of the first storage system, wherein program states of the first and second programs then diverge, wherein the first program sends data storage requests to the first storage system, wherein the second program sends data storage requests to the second storage system.

23. A system having replicated programs and data storage, the system comprising:
 a first device configured to run a first program, and record, as program replication data, user input to the first program by monitoring the first program and trapping system calls;
 a second device configured to run a second program, the first device being configured to send the program replication data to the second device when the first program and the second program are running such that the second program operates on the same user input as the first program, the second program having an application program that is a replica of an application program of the first program, the program replication data causing the second program to mirror a state of the first program for enabling at least one of a user and an application interaction with the second program as if it were the first program when the first program fails, thereby improving efficiency of the system by reducing an amount of system downtime following a failure of the first program;
 a first storage system configured to receive data storage requests from the first device; and
 a second storage system, data stored in the first storage system being replicated in the second storage system.

24. A system having replicated programs and data storage, the system comprising:
 a device configured to:
  run a first program and a second program;
  record, as program replication data, user input to the first program by monitoring the first program and trapping system calls;
  send the program replication data to the second program when the first program and the second program are running such that the second program operates on the same user input as the first program, the second program having an application program that is a replica of an application program of the first program, the program replication data causing the second program to mirror a state of the first program for enabling at least one of a user and an application interaction with the second program as if it were the first program when the first program fails; and
  use a record and reply program replication scheme to enable synchronization between the first and second programs, wherein using the record and reply program replication scheme reduces an amount of data involved with maintaining the synchronization;
 a first storage system configured to receive data storage requests from the device; and a second storage system, data stored in the first storage system being replicated in the second storage system.

25. A computer program product comprising a non-transitory computer useable medium having a computer readable program, wherein the computer readable program when executed on a computer causes the computer to:
  record, by the computer and as program replication data, user input to a first program by monitoring the first program and trapping system calls;
  send, by the computer, the program replication data from the first program to a second program such that the second program operates on the same user input as the first program, the second program having an application program that is a replica of an application program of the first program, the program replication data causing the second program to mirror a state of the first program for enabling at least one of a user and an application interaction with the second program as if it were the first program when the first program fails, thereby improving efficiency of the computer by reducing an amount of processing power and run time consumed by the computer in order to enable at least one of the user and the application interaction with the second program following a failure of the first program;
  send, by the computer, data storage requests from the first program to a first storage system; and
  replicate, by the computer, data stored in the first storage system in a second storage system.

* * * * *